ized under 35 U.S.C. 154(b) by 376 days.

(12) United States Patent
Ahn et al.

(10) Patent No.: US 8,709,637 B2
(45) Date of Patent: Apr. 29, 2014

(54) ELECTRODE ASSEMBLY WITH CENTRALLY WOUND SEPARATOR MEMBER

(75) Inventors: Changbum Ahn, Suwon-si (KR); Jeongsoon Shin, Suwon-si (KR); Youngbae Sohn, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 376 days.

(21) Appl. No.: 12/772,113

(22) Filed: Apr. 30, 2010

(65) Prior Publication Data

US 2011/0104572 A1 May 5, 2011

Related U.S. Application Data

(60) Provisional application No. 61/257,368, filed on Nov. 2, 2009.

(51) Int. Cl.
*H01M 2/14* (2006.01)

(52) U.S. Cl.
USPC ............ 429/131; 429/152; 429/247; 429/129

(58) Field of Classification Search
USPC .................. 429/131, 152, 247, 129
See application file for complete search history.

(56) References Cited

U.S. PATENT DOCUMENTS

| 2002/0009649 | A1 | 1/2002 | Sato et al. | |
|---|---|---|---|---|
| 2002/0160257 | A1* | 10/2002 | Lee et al. | 429/130 |
| 2003/0031925 | A1 | 2/2003 | During | |
| 2007/0184350 | A1* | 8/2007 | Kim et al. | 429/247 |
| 2008/0305398 | A1 | 12/2008 | Komiya | |
| 2011/0217586 | A1 | 9/2011 | Kim et al. | |

FOREIGN PATENT DOCUMENTS

| CN | 101218694 | | 7/2008 | |
|---|---|---|---|---|
| JP | 11-007976 | | 1/1999 | |
| JP | 2001-155775 | A | 6/2001 | |
| JP | 2001155775 | A * | 6/2001 | ............ H01M 10/38 |
| JP | 2008-204706 | | 9/2008 | |
| KR | 10-2000-0051739 | | 8/2000 | |
| KR | 2000-0077027 | | 12/2000 | |
| KR | 10-2001-0113525 | | 12/2001 | |
| KR | 2001-0113525 | A | 12/2001 | |
| KR | 10-2002-0042643 | | 6/2002 | |
| KR | 2002-0042643 | A | 6/2002 | |

(Continued)

OTHER PUBLICATIONS

Korean Office Action dated Sep. 8, 2011 in Application No. 10-2010-0107791.

Extended Search Report dated Feb. 28, 2011 in corresponding Application No. 10189595.1.

(Continued)

*Primary Examiner* — Zachary Best
(74) *Attorney, Agent, or Firm* — Knobbe, Martens, Olson & Bear, LLP (57) ABSTRACT

An electrode assembly for a secondary battery and a method of manufacturing the same are disclosed. An electrode assembly comprises: a plurality of separator members formed by winding a central separator member, wherein the central separator member is a predetermined portion of the separator; and a plurality of electrode members positioned between each of the separator members; wherein the separator including the plurality of separator members and the central separator member is one of the plurality of separator members, and wherein both opposite ends of the central separator member is curved in opposite directions, respectively.

13 Claims, 8 Drawing Sheets

(56) References Cited

FOREIGN PATENT DOCUMENTS

| KR | 10-2006-0060715 | | 6/2006 | |
| KR | 2006-0060715 | A | 6/2006 | |
| KR | 2009-0110469 | | 10/2009 | |
| WO | WO 9016089 | | 12/1990 | |
| WO | WO 2004/097971 | A1 | 11/2004 | |
| WO | WO 2004097971 | A1 * | 11/2004 | ............ H01M 10/38 |
| WO | WO 2005/022677 | A | 3/2005 | |

OTHER PUBLICATIONS

Notice of Allowance Dated Apr. 25, 2012 for corresponding KR Application No. 10-2010-0107791.

Office Action dated Jan. 7, 2013 for corresponding CN Application No. 201010534346.1.

Office Action dated Mar. 5, 2013 for corresponding JP Application No. 2010-246379.

* cited by examiner

ELECTRODE ASSEMBLY WITH CENTRALLY WOUND SEPARATOR MEMBER

CROSS-REFERENCE TO RELATED APPLICATIONS

This application claims priority to and the benefit of U.S. Provisional Application No. 61/257,368, filed on Nov. 2, 2009, the entire content of which is incorporated herein by reference.

BACKGROUND

1. Field

The present disclosure relates to an electrode assembly for a secondary battery and a method of manufacturing the same.

2. Description of the Related Technology

A secondary battery is generally manufactured by accommodating an electrode assembly having a positive electrode plate, a negative electrode plate, and a separator interposed therebetween into an exterior case together with an electrolyte.

In a high capacity secondary battery, a wound electrode assembly including a plurality of unit electrodes and separators may be used. In the wound electrode assembly, in a case where the number of turns of winding increases, it is not easy to accurately align the unit electrodes with the separators interposed therebetween.

SUMMARY

According to an aspect of the present invention, an electrode assembly comprises: a plurality of separator members formed by winding a central separator member, wherein the central separator member is a predetermined portion of the separator; and a plurality of electrode members positioned between each of the separator members; wherein the separator including the plurality of separator members and the central separator member is one of the plurality of separator members, and wherein both opposite ends of the central separator member is curved in opposite directions, respectively.

According to another aspect of the present invention, a secondary battery includes the electrode assembly having the above-described configuration.

According to still another aspect of the present invention, a method of forming an electrode assembly comprises: forming a plurality of electrode members aligned in a first direction on a separator; forming a plurality of first and second electrode members on both surfaces of separator, respectively; and winding the separator from a central separator member to form a plurality of separator members interposed between the electrode members; wherein the central separator is predetermined portion of the separator, and wherein winding comprises both opposite ends of the central separator member is curved in opposite directions, respectively.

DETAILED DESCRIPTION

As illustrated in FIGS. 1 to 7, a battery pack 100 according to an embodiment of the present invention can include a bare cell 110, a protective circuit module 120 electrically connected to the bare cell 110 to control the charge and discharge of the bare cell 110, a first lead plate 130 and a second lead plate 140 supporting the protective circuit module 120 and electrically connecting the bare cell 110 to the protective circuit module 120, and a cover 150 surrounding the bare cell 110 and the protective circuit module 120.

Hereinafter, embodiments of the present invention will be described in detail with reference accompanying drawings.

Figure 1:
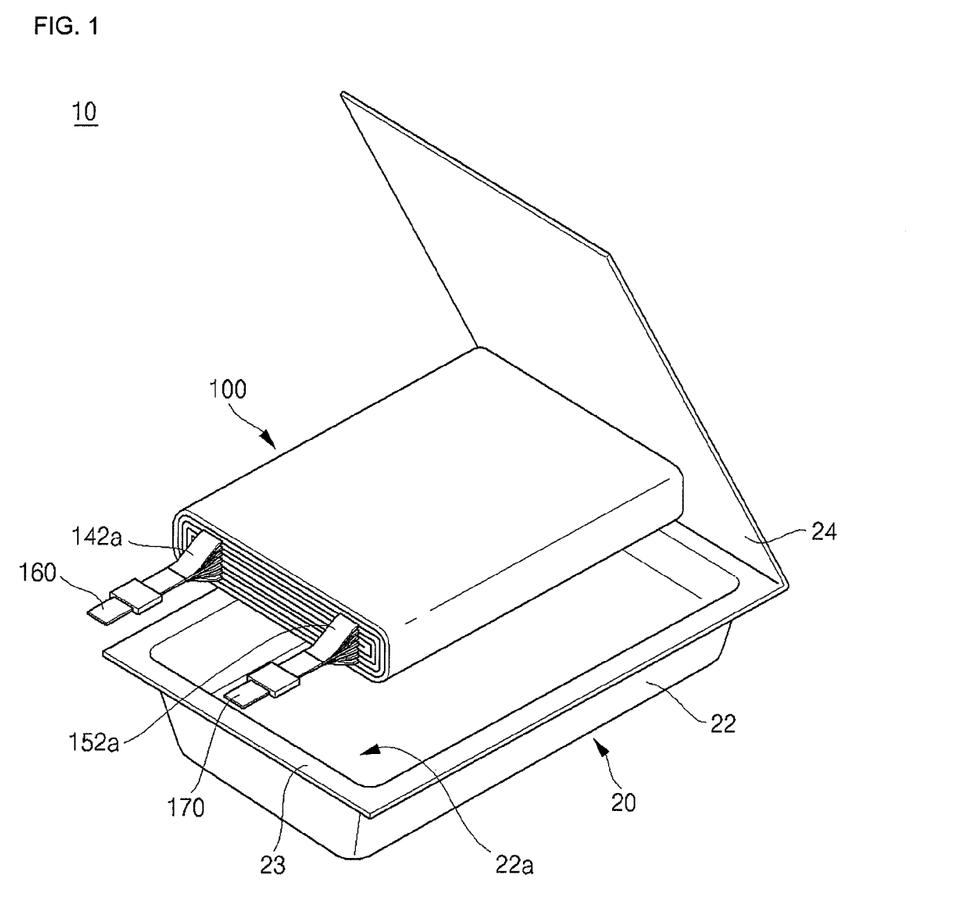
FIG. 1 is a perspective view illustrating a secondary battery including an electrode assembly according to an embodiment of the present invention.

FIG. 1 is a perspective view illustrating a secondary battery including an electrode assembly according to an embodiment of the present invention. Referring to FIG. 1, the secondary battery 10 is a pouch type secondary battery and includes a pouch case 20 and an electrode assembly 100 to be accommodated in the pouch case 20.

The pouch case 20 can include a body 22 and a cover 24. The body 22 can include an accommodating portion 22a to accommodate the electrode assembly 100 and a sealing portion 23 extending to the outside of the accommodating portion 22a. The cover 24 can be integrally coupled to one side of the sealing portion 23. After the electrode assembly 100 is accommodated in the accommodating portion 22a of the body 22, the body 22 and the cover 24 can contact each other closely and the sealing portion 23 can then be thermally welded.

Figure 2:
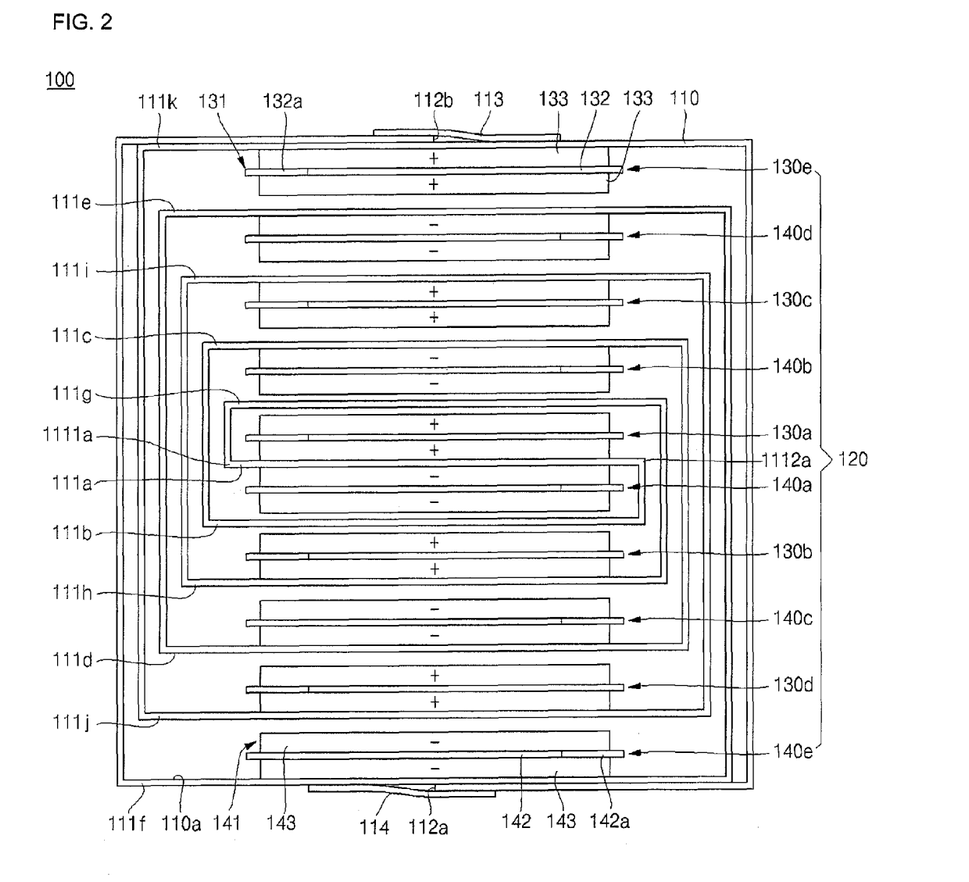
FIG. 2 is a schematic view illustrating an electrode assembly in FIG. 1.

FIG. 2 is a schematic view illustrating the electrode assembly in FIG. 1. Referring to FIGS. 1 and 2, the electrode assembly 100 may include a separator 110 and a plurality of electrodes 120.

The separator 110 may be wound in one direction in view of a central portion 111a in a longitudinal direction and have a constant width, that is, clockwise when viewed from the drawing, which corresponds to a winding core. The wound separator 110 may include a plurality of stacked separator members 111a, 111b, 111c, 111d, 111e, 111f, 111g, 111h, 111i, 111j, and 111k with the winding core 111a positioned innermost. Each of a plurality of electrodes 120 may be positioned between each of the plurality of stacked separator members 111a, 111b, 111c, 111d, 111e, 111f, 111g, 111h, 111i, 111j, and 111k. Opposite ends 1111a and 1112a of the central separator member corresponding to the winding core 111a may be bent in opposite directions to then be connected to the separator members 111b and 111g facing the central separator member 111a. Longitudinally opposite ends 112a and 112b may be attached to the outer circumferential surface of the separator 110 using adhesive tapes 113 and 114. The separator 110 may have a plurality of micropores allowing lithium ions migrating between the electrodes 120 to pass.

The separator 110 may be made of a polymer such as polyethylene (PE) or polypropylene (PP).

The plurality of electrodes 120 may be positioned one by one between each of the separator members 111a, 111b, 111c, 111d, 111e, 111f, 111g, 111h, 111i, 111j, and 111k of the separator 110. The plurality of electrodes 120 may be arranged such that cores of two neighboring electrodes 120 are positioned at the same position with the separator 110 interposed therebetween. Accordingly, all of the plurality of electrodes 120 may be accurately aligned in a direction perpendicular to the separator members 111a, 111b, 111c, 111d, 111e, 111f, 111g, 111h, 111i, 111j, and 111k. The electrodes 130a and 140a positioned at opposite sides of the central separator member 111a may be attached to both surfaces of the central separator member 111a, and the remaining electrodes 130b, 130c, 130d, 130e, 140b, 140c, 140d, and 140e may be attached to the inner surface of the central separator member 111a.

The electrodes 120 can include a plurality of first electrode members 130a, 130b, 130c, 130d, and 130e and a plurality of second electrode members 140a, 140b, 140c, 140d, and 140e. The first electrode members 130a, 130b, 130c, 130d, and 130e and the second electrode members 140a, 140b, 140c, 140d, and 140e may be alternatively positioned.

Each of the first electrode members 130a, 130b, 130c, 130d, and 130e can include a positive electrode plate 131. The positive electrode plate 131 can include a positive electrode collector 132 and positive electrode active materials 133 coated on both sides of the positive electrode collector 132. The positive electrode collector 132 may generally be formed as a plate made of an electrically conductive metal such as aluminum. The positive electrode collector 132 may have a positive electrode tab 132a protruded outwardly without the positive electrode active material 133. The positive electrode tab 132a of the positive electrode plate 131 may be welded to a positive terminal 160 protruded to the outside of the pouch case 20 by ultrasonic or resistance welding. The positive electrode active material 133 can include a layered lithium compound, an electrically conductive material to increase electric conductivity, and a binder to increase a binding force between the layered compound and the conductive material.

Each of the second electrode members 140a, 140b, 140c, 140d, and 140e can include a negative electrode plate 141. The negative electrode plate 141 can include a negative electrode collector 142 and negative electrode active materials 143 coated on both sides of the negative electrode collector 142. The negative electrode collector 142 may generally be formed as a plate made of an electrically conductive metal, such as copper. The negative electrode collector 142 can have a negative electrode tab 142a protruded outwardly without the negative electrode active material 143. The negative electrode tab 142a of the respective negative electrode plates 141 may be welded to a negative terminal 170 protruded to the outside of the pouch case 20 by ultrasonic or resistance welding. The negative electrode active material 143 may be prepared by mixing a carbon material such as graphite and a binder to increase the binding force between carbon particles. In this case, the positive electrode plate may have an area smaller than that of the negative electrode plate. Further, when tin oxide (SnO) or lithium titanium oxide (LTO) is used as the negative electrode active material, the corresponding positive electrode plate may have an area larger than that of the negative electrode plate.

Figure 3:
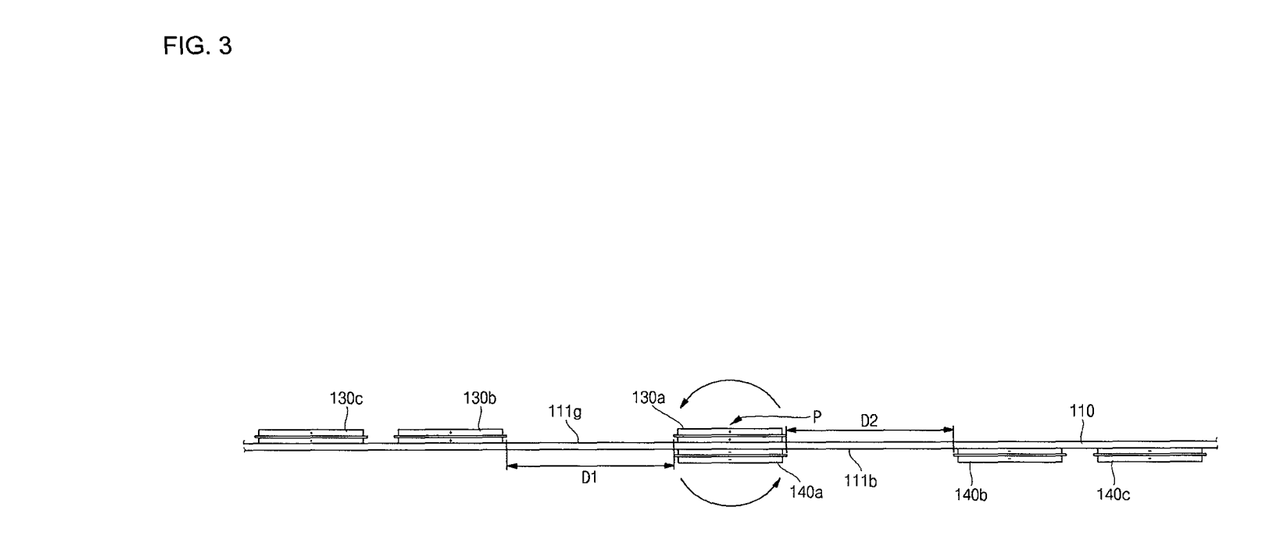
FIG. 3 is a view illustrating a manufacturing process of the electrode assembly in FIG. 2.

FIG. 3 shows a process for manufacturing the electrode assembly shown in FIG. 2. Referring to FIG. 3, the separator 110, which can include the first electrode members 130a, 130b, and 130c and the second electrode members 140a, 140b, and 140c, is wound about a winding position P centrally positioned in a longitudinal direction. The first electrode member 130a and the second electrode member 140a may be disposed at equal positions on both surfaces of the separator 110 about the winding position P. Here, the central separator member 111a may be positioned at the winding position P. At one side of the winding position P, the first electrode members 130b and 130c may be linearly arranged on, the same surface as the first electrode member 130a. At the other side, which is opposite to the side of the winding position P, the second electrode members 140b and 140c may be linearly arranged on the same surface as the second electrode member 140a. A distance D1 between the first electrode member 130a may be positioned at the winding position P, and the first electrode member 130b arranged next to the first electrode member 130a may be adjusted such that the first electrode member 130a is covered by the separator member 111g formed between the first electrode members 130a and 130b in the separator 110. In addition, a distance D2 between the second electrode member 140a positioned at the winding position P and the second electrode member 140b arranged next to the second electrode member 140a may be adjusted such that the second electrode member 140a is covered by the separator member 111b formed between the second electrode members 140a and 140b in the separator 110. Winding may be performed in a direction as shown in FIG. 3 on the first electrode members 130b and 130c and the second electrode members 140b and 140c, except for on the first electrode member 130a and the second electrode member 140a which would be positioned inside the wound assembly at the winding position P. In the configuration shown in FIG. 3, the central separator members are rotated with respect to the center thereof in the direction indicated by the arrows through a conventional tool such as a mandrel. In this configuration, the separator 110 is rotationally pulled and both end portions of the separator 110 are moved toward the center of the electrode members 130a and 140a. Consequently, the electrode member 130a overlaps with the separator member 111b and the electrode member 140a overlaps with the separator member 111g. The above process is repeatedly performed to complete the electrode assembly according to the present invention. The plurality of electrode members 130a, 130b, 130c, 140a, 140b and 140c may be added during the winding, and the distance between each of the electrodes 130 may be easily adjusted to achieve accurate alignment of the electrodes 130 during the winding. In other words, the electrodes 130 can be added to the separator 110 such that the distance between each of the electrodes 130 gradually increases as the winding continues. Thus, the plurality of electrode members 130a, 130b, 130c, 140a, 140b and 140c may be aligned at accurate positions.

Figure 4:
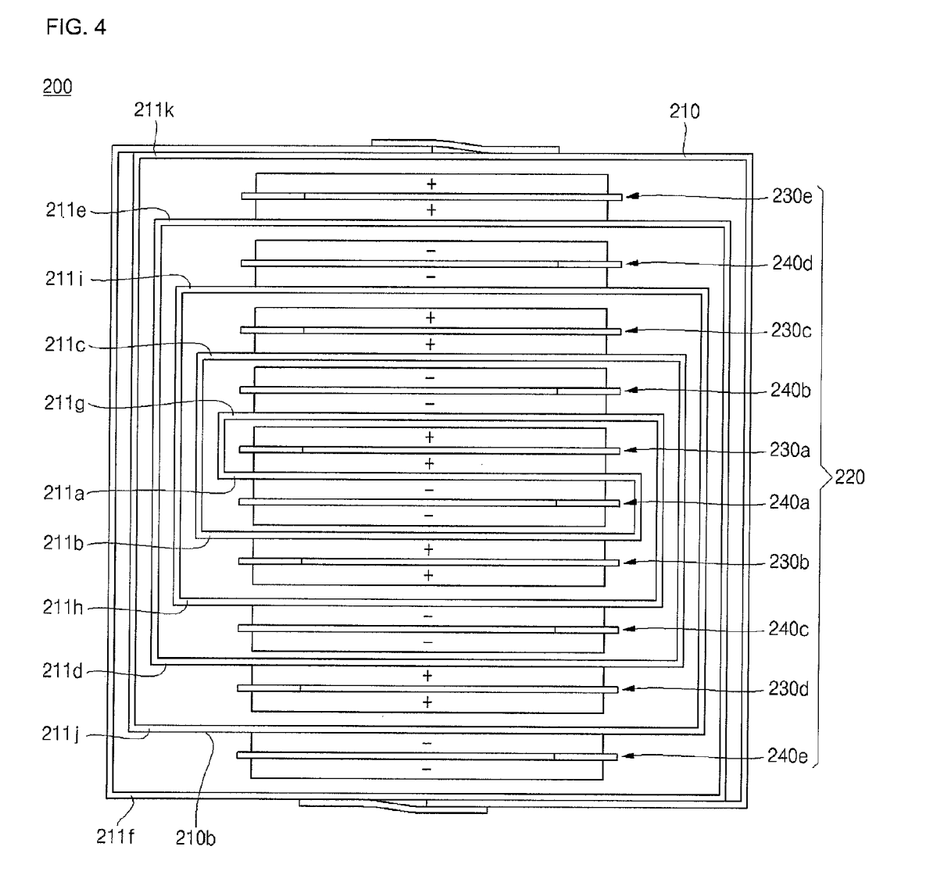
FIG. 4 is a schematic view illustrating an electrode assembly according to another embodiment of the present invention.

FIG. 4 is a schematic view of an electrode assembly according to another embodiment of the present invention.

Referring to FIG. 4, the electrode assembly 200 can include a separator 210 and a plurality of electrode members 220. Because the configuration and operation of the separator 210 may be identical to those of the separator 110 according to the previous embodiment shown in FIG. 2, detailed descriptions thereof will be omitted.

Each of the plurality of electrode members 220 may be positioned between each of a plurality of separator members 211a, 211b, 211c, 211d, 211e, 211f, 211g, 211h, 211i, 211j, and 211k of the separator 210. The plurality of electrode members 220 may be arranged such that the centers of two neighboring electrode members of the plurality of electrode members 220 are aligned at the same position as the separator 210 interposed therebetween. For example, electrode members 230a and 240a of the plurality of electrode members 220, positioned at opposite sides of a central separator member 211, may be attached to both surfaces of the central separator member 211a, and the other electrode members 230b, 230c, 230d, 230e, 240b, 240c, 240d, and 240e may be attached to outer surfaces 210b of the separator 210. Because the other structures and operations of the electrode assembly 200 may be identical to those of the electrode assembly 100 according to the previous embodiment shown in FIG. 2, detailed descriptions thereof will be omitted.

Figure 5:
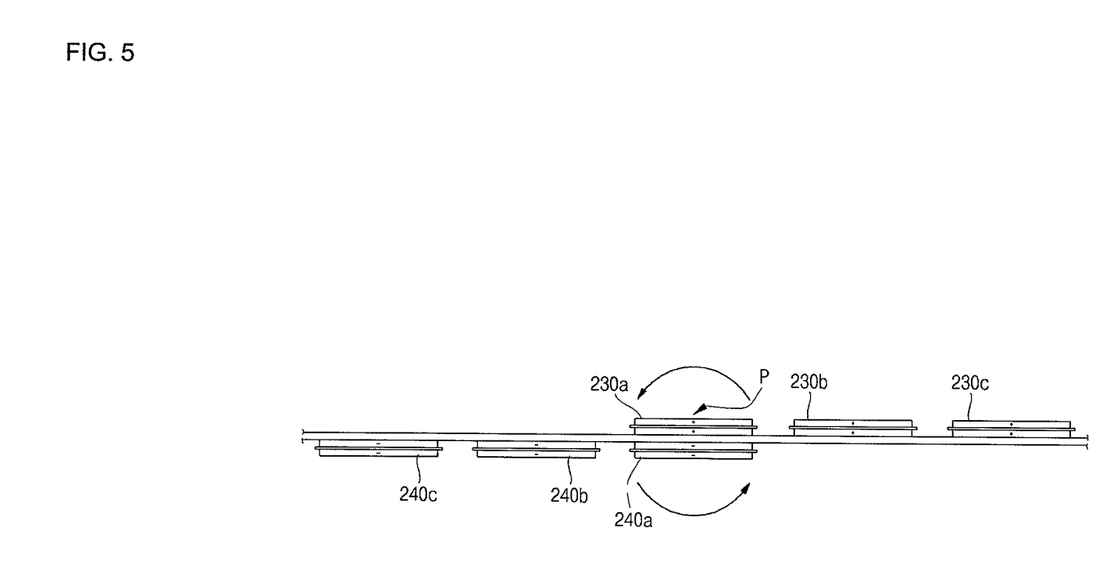
FIG. 5 is a view illustrating a manufacturing process of the electrode assembly in FIG. 4.

A process of manufacturing the electrode assembly as shown in FIG. 4 is illustrated in FIG. 5.

Referring to FIG. 5, the separator 210, which includes the first electrode members 230a, 230b, and 230c and the second electrode members 240a, 240b, and 240c, may be wound in a longitudinal direction about a centrally positioned winding position P. The first electrode member 230a and the second electrode member 240a may be disposed at the same position, the winding position P, on both surfaces of the separator 210. At one side of the winding position P, the first electrode members 230b and 230c may be linearly arranged on the same surface as the first electrode member 230a. At the other opposite side of the winding position P, the second electrode members 240b and 240c may be linearly arranged on the same surface as the second electrode member 240a. Winding may be performed in a direction as shown in FIG. 5 on the first electrode members 230b and 230c and on the second electrode members 240b and 240c, except for on the first electrode member 230a and the second electrode member 240a which would be positioned inside the wound assembly at the winding position P.

Figure 6A:
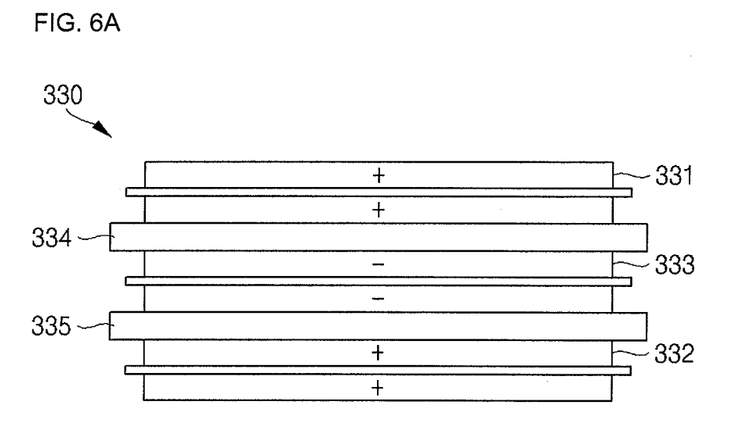
FIG. 6A is a schematic view illustrating a modification of a first electrode of the electrode assembly shown in FIG. 2.
Figure 6B:
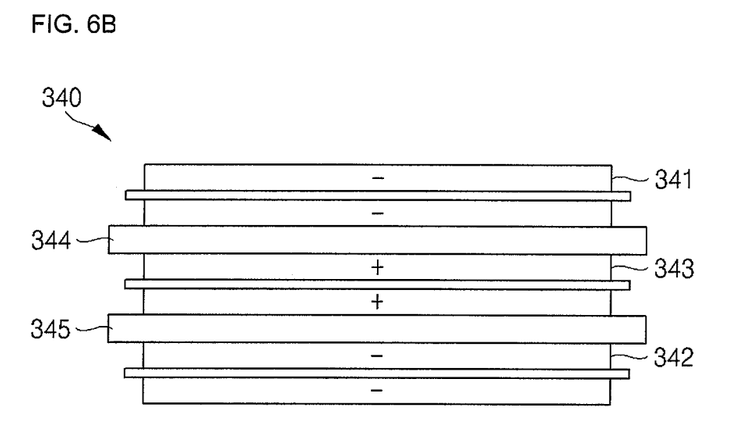
FIG. 6B is a schematic view illustrating a modification of a second electrode of the electrode assembly shown in FIG. 2.

FIGS. 6A and 6B illustrate a first electrode and a second electrode according to another embodiment of the present invention, respectively.

Referring to FIG. 6A, the first electrode 330 can include two positive electrode plates 331 and 332, a single negative electrode plate 333 positioned between the positive electrode plates 331 and 332, and two separators 334 and 335 respectively inserted between the negative electrode plate 333 and the positive electrode plate 331 and between the negative electrode plate 333 and the positive electrode plate 332. Because the two positive electrode plates 331 and 332 may be identical to the positive electrode plate 131 as shown in FIG. 2, and the negative electrode plate 333 may be identical to the negative electrode plate 141 as shown in FIG. 2, detailed descriptions thereof will be omitted. Micropores may be formed in the separators 334 and 335, and lithium ions migrating between the electrode plates 331, 332, and 333 can pass through the micropores. The separators 334 and 335 may be formed of a polymer, such as polyethylene (PE) or polypropylene (PP).

Referring to FIG. 6B, the second electrode 340 can include two negative electrode plates 341 and 342, a single positive electrode plate 343 positioned between the negative electrode plates 341 and 342, and two separators 344 and 345 respectively inserted between the negative electrode plate 333 and the positive electrode plate 331 and between the negative electrode plate 333 and the positive electrode plate 332. Since the two negative electrode plates 341 and 342 may be identical to the negative electrode plate 141 as shown in FIG. 2 and the positive electrode plate 343 may be identical to the positive electrode plate 131 as shown in FIG. 2, detailed descriptions thereof will be omitted. Micropores may be formed in the separators 344 and 345, and lithium ions migrating between the electrode plates 341, 342, and 343 pass through the micropores. The separators 344 and 345 may be made of a polymer, such as polyethylene (PE) or polypropylene (PP).

In the embodiment of FIGS. 6A and 6B, each of the first and second electrodes may be formed by three electrode plates, but embodiments of the present invention are not limited thereto. That is, the first and second electrodes may be formed by more than three electrode plates. Alternatively, any structure may be employed, wherein electrode plates having different polarities are alternatively positioned and electrode plates having the same polarities are positioned opposite to each other.

Figure 7:
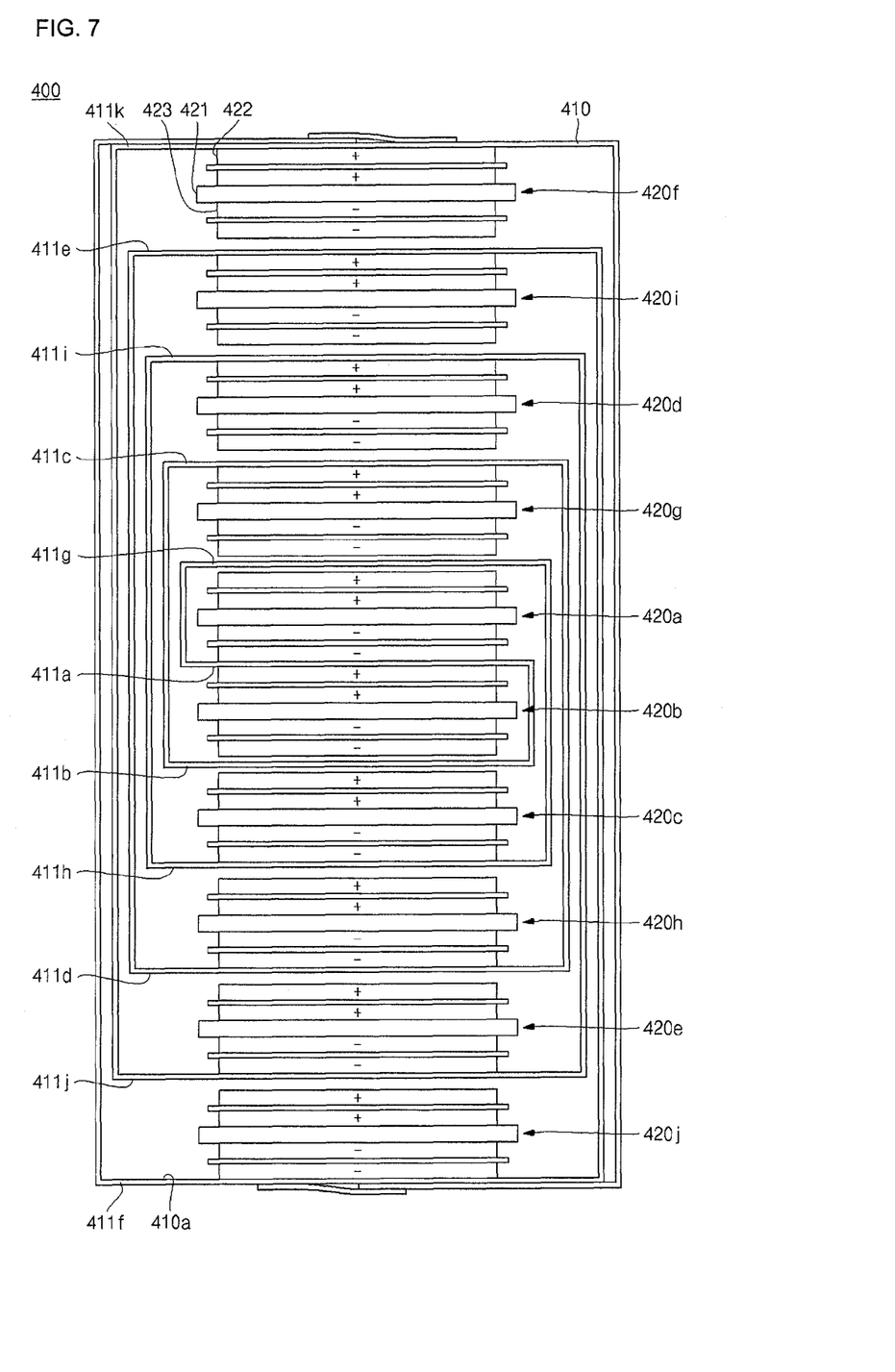
FIG. 7 is a schematic view illustrating another modification of the electrode assembly shown in FIG. 1.

FIG. 7 is a schematic view illustrating another modification of the electrode assembly shown in FIG. 1.

Referring to FIG. 7, the electrode assembly 400 can include a separator 410 and a plurality of electrode members 420a, 420b, 420c, 420d, 420e, 420f, 420g, 420h, 420i, and 420j.

Since structures and operations of the separator 410 may be identical to those of the separator 110, detailed descriptions thereof will be omitted.

Each of the plurality of electrode members 420a, 420b, 420c, 420d, 420e, 420f, 420g, 420h, 420i, and 420j may be positioned between each of a plurality of separator members 411a, 411b, 411c, 411d, 411e, 411f, 411g, 411h, 411i, 411j, and 411k of the separator 410. The plurality of electrode members 420a, 420b, 420c, 420d, 420e, 420f, 420g, 420h, 420i, and 420j may be arranged such that centers of two neighboring electrode members are aligned at the same position with the separator 410 interposed therebetween. For example, electrode members 420a and 420b positioned at opposite sides of a central separator member 411a may be attached to both surfaces of the central separator member 411a, and the other electrode members 420c, 420d, 420e, 420f, 420g, 420h, 420i, and 420j may be attached to inner surfaces 410b of the separator 410.

Each of the plurality of electrode members 420a, 420b, 420c, 420d, 420e, 420f, 420g, 420h, 420i, and 420j can include a positive electrode plate 422 and a negative electrode plate 423 formed at opposite sides of a separator 421 interposed therebetween. Micropores may be formed in the separator 421, and lithium ions migrating between the electrode plates 422 and 423 can pass through the micropores. The separator 421 may be made of a polymer, such as polyethylene (PE) or polypropylene (PP). The positive electrode plate 422 may be identical to the positive electrode plate 131 as shown in FIG. 2, and the negative electrode plate 423 may be identical to the negative electrode plate 141 as shown in FIG. 2. Thus, detailed descriptions thereof will be omitted. The electrode members 420a, 420b, 420c, 420d, 420e, 420f, 420g, 420h, 420i, and 420j may be formed such that electrode plates having different polarities face each other with the separator 410 interposed therebetween.

The electrode assembly 400 shown in FIG. 7 may be manufactured by arranging the plurality of electrode members 420a, 420b, 420c, 420d, 420e, 420f, 420g, 420h, 420i, and 420j in the same manner as shown in FIG. 3, and winding the same.

Figure 8:
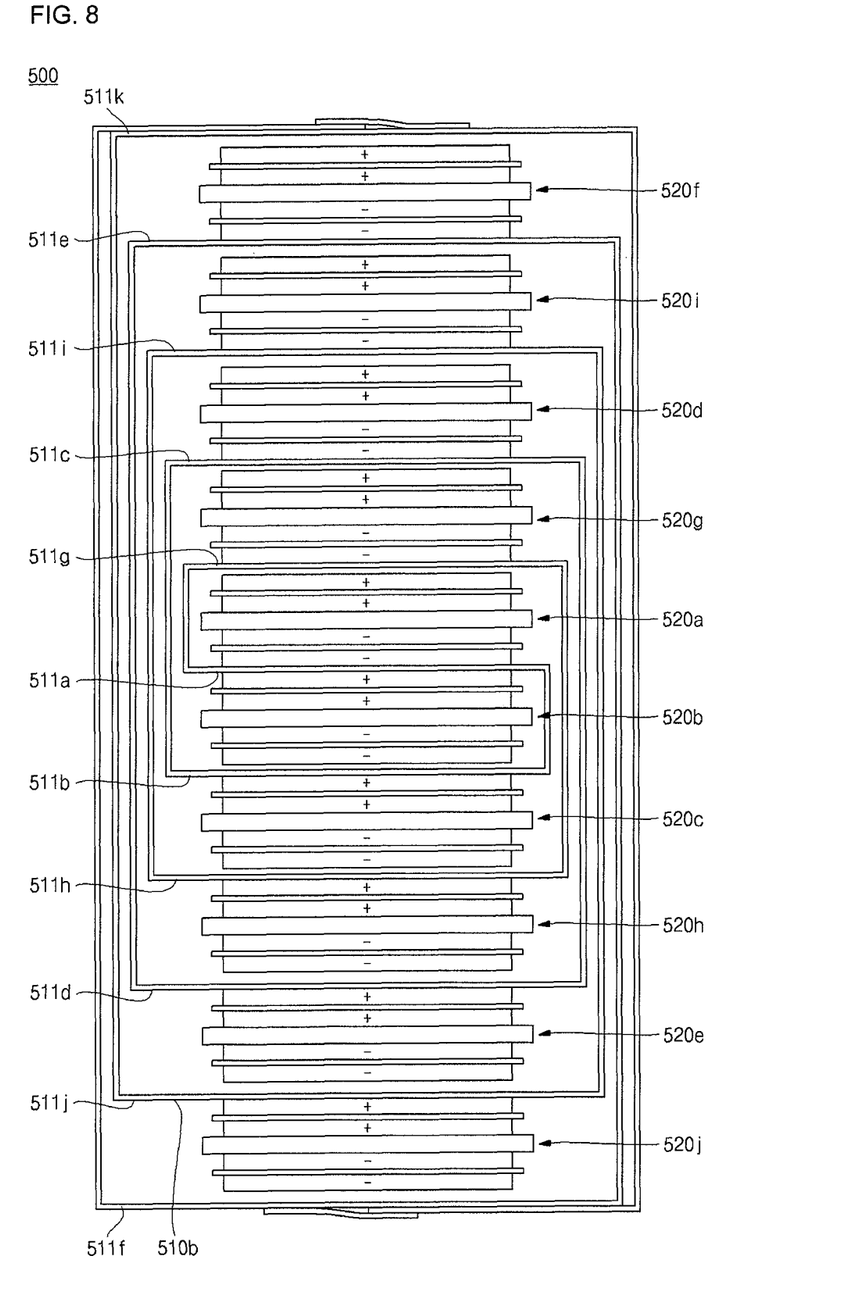
FIG. 8 is a schematic view illustrating still another modification of the electrode assembly shown in FIG. 1.

FIG. 8 is a schematic view illustrating still another modification of the electrode assembly shown in FIG. 1.

Referring to FIG. 8, the electrode assembly 500 can include a separator 510 and a plurality of electrode members 520a, 520b, 520c, 520d, 520e, 520f, 520g, 520h, 520i, and 520j.

Since structures and operations of the separator 510 may be identical to those of the separator 110, detailed descriptions thereof will be omitted.

Each of the plurality of electrode members 520a, 520b, 520c, 520d, 520e, 520f, 520g, 520h, 520i, and 520j may be positioned between each of a plurality of separator members 511a, 511b, 511c, 511d, 511e, 511f, 511g, 511h, 511i, 511j, and 511k of the separator 510. The plurality of electrode members 520a, 520b, 520c, 520d, 520e, 520f, 520g, 520h, 520i, and 520j may be arranged such that centers of two neighboring electrode members are aligned at the same position with the separator 510 interposed therebetween. For example, electrode members 520a and 520b positioned at opposite sides of a central separator member 511a may be attached to both surfaces of the central separator member 511a, and the other electrode members 520c, 520d, 520e, 520f, 520g, 520h, 520i, and 520j may be attached to outer surfaces 510b of the separator 510. Because the other structures and operations of the electrode assembly 500 may be identical to those of the electrode assembly 400 according to the previous embodiment shown in FIG. 7, detailed descriptions thereof will be omitted.

The electrode assembly 500 shown in FIG. 8 may be manufactured by arranging the plurality of electrode members 520a, 520b, 520c, 520d, 520e, 520f, 520g, 520h, 520i, and 520j in the same manner as shown in FIG. 5, and winding the same.

As described above, since the winding of the separator can start from its central portion, rather than its terminal portion, the number of turns of winding can be reduced by half, compared to a case when the winding starts from the terminal portion of the separator. Further, since the electrode members positioned at opposite sides with the separator interposed therebetween can be wound in a symmetrical manner, the plurality of electrode members formed on the separator can be accurately aligned.

Although embodiments of the present invention have been described in detail herein, it should be understood that many variations and modifications of the inventive concepts herein described, which may appear to those skilled in the art, will still fall within the spirit and scope of embodiments of the present invention as defined in the appended claims.

What is claimed is:

1. An electrode assembly comprising;
    a plurality of separator members formed by winding a separator on the basis of a central separator member, wherein the central separator member is a predeterminated portion of the separator; and
    a plurality of electrode members positioned between each of the separator members wherein the plurality of electrode members are attached to opposing sides of the separator member;
    wherein the separator including the plurality of separator members and the central separator member is one of the plurality of separator members and wherein the plurality of electrode members comprise a first and second electrode member having inner and outer surfaces wherein the inner surfaces of the first and second electrode members are attached to the central separator member, and
    wherein both opposite ends of the central separator member are curved in opposite directions, respectively,
    wherein the plurality of electrodes members comprises an electrode collector, respectively,
    wherein each of the electrode collectors is physically divided from each other on the winding separator so that no electrode member is attached to two portions of the winding separator immediately adjacent both sides of the central separator member and wherein the portions of the winding separator having no electrode member attached thereto cover the outer surface of the first and second electrode members.

2. The electrode assembly of claim 1, wherein both opposite ends of each separator members except the central separator member are curved in the same direction.

3. The electrode assembly of claim 1, wherein the central separator member is formed so that the first electrode member and the second electrode member are positioned at the both opposite ends of the central separator, respectively.

4. The electrode assembly of claim 3, wherein all of the first electrode members including the first electrode member that is formed at the surface of the central separator member are formed on one surface of the separator and all of the second electrode members including the second electrode member that is formed at the surface of the central separator member are formed on the other surface of the separator, wherein the other surface of the separator is opposite to the one surface of the separator.

5. The electrode assembly of claim 4, wherein the first electrode members are formed from the central separator member so as to extend in a first longitudinal direction and the second electrode members are formed from the central separator member so as to extend in a second longitudinal direction.

6. The electrode assembly of claim 4, wherein the plurality of electrode members are formed extending away from the central separator member, and wherein the greater the spacing between the adjacent electrode members increases the distance between each of the adjacent electrode members.

7. The electrode assembly of claim 1, wherein the plurality of electrode members respectively comprises:
    at least one positive electrode member;
    at least one negative electrode member alternately arranged with the positive electrode; and
    at least one separating element interposed between the at least one positive electrode member and the at least one negative electrode member.

8. The electrode assembly of claim 1, wherein the plurality of electrode members further comprises an electrode tab extending from the electrode collector, respectively, that can be coupled to a terminal, and the electrode collector comprises electrode active materials coated on both surface of the electrode collector.

9. A method of forming an electrode assembly comprising:
    forming a plurality of electrode members aligned in a first direction on a separator;
    forming a plurality of first and second electrode members on both surfaces of a separator, respectively by attaching the first and second electrode members to both of the surfaces of a central separator member of the separator; and
    winding the separator from the central separator member to form a plurality of separator members interposed between the electrode members wherein the plurality of electrode members comprise a first and second electrode member having inner and outer surfaces wherein the inner surfaces of the first and second electrode members are separated by the central separator member;
    wherein the central separator is a predeterminated portion of the separator; and
    wherein winding causes both opposite ends of the central separator member to be is curved in opposite directions, respectively,
    wherein the plurality of electrode members comprises an electrode collector, respectively,
    wherein each of the electrode collectors are physically divided from each other on the winding separator so that no electrode member is attached to two a portions of the winding separator immediately adjacent both sides of the central separator member and wherein the two portions of the winding separator having no electrode member attached thereto cover the outer surface of the first and second electrode members.

10. The method of claim 9, wherein the winding comprises both opposite ends of each separator member except the central separator member is curved in the same direction.

11. The method of claim 9, wherein forming a plurality of first electrode members comprises forming the plurality of first electrode members so as to extend from the central separator member in a first longitudinal direction and forming the plurality of second electrode members comprises forming the plurality of second electrode members so as to extend from the central separator member in a second longitudinal direction.

12. The method of claim 11, wherein the further electrode members are formed extending away from the central separator member, wherein the greater the spacing between adjacent electrode members increases the distance between each of the adjacent the electrode members.

13. The method of claim 9, wherein forming a plurality of first and second electrode members includes forming at least one positive electrode member and at least one negative electrode member, such that electrode members are alternately arranged with each other; and forming at least one separating element, such that the at least one separating element is interposed between electrode members.

\* \* \* \* \*